(12) United States Patent
Perry

(10) Patent No.: US 6,500,522 B1
(45) Date of Patent: *Dec. 31, 2002

(54) POINTING DEVICE INCLUDING A COMPUTER MOUSE PAD

(76) Inventor: Robert C. Perry, 5755 SW. Willow La., Lake Oswego, OR (US) 97035-5340

( * ) Notice: Subject to any disclaimer, the term of this patent is extended or adjusted under 35 U.S.C. 154(b) by 149 days.

This patent is subject to a terminal disclaimer.

(21) Appl. No.: 09/655,988

(22) Filed: Sep. 6, 2000

Related U.S. Application Data

(63) Continuation-in-part of application No. 09/209,050, filed on Dec. 19, 1998, now Pat. No. 6,143,395, which is a continuation-in-part of application No. PCT/US99/26216, filed on Nov. 2, 1999.

(51) Int. Cl.[7] .............................. B32B 3/00; G09G 5/08
(52) U.S. Cl. ...................... 428/156; 428/156; 428/167; 345/163
(58) Field of Search ................................ 428/156, 167, 428/172, 141; 248/346.01, 118.1; 2/16, 20; 400/715; 345/157, 163, 167; 341/22

(56) References Cited

U.S. PATENT DOCUMENTS

| | | | |
|---|---|---|---|
| 4,485,919 A | 12/1984 | Sandel | |
| 4,799,054 A | * 1/1989 | House | 340/710 |
| 4,868,940 A | 9/1989 | Masadi | |
| 5,360,653 A | 11/1994 | Ackley | |
| 5,508,084 A | 4/1996 | Reeves et al. | |
| 6,143,395 A | * 11/2000 | Perry | 428/156 |

* cited by examiner

*Primary Examiner*—Donald J. Loney
(74) *Attorney, Agent, or Firm*—John Smith-Hill; Smith-Hill and Bedell

(57) ABSTRACT

The upper surface of a mouse pad is formed with grooves of width substantially smaller than the diameter of the mouse ball, whereby particles that fall in the grooves do not adhere to the mouse ball when the mouse is moved over the mouse pad.

11 Claims, 2 Drawing Sheets

POINTING DEVICE INCLUDING A COMPUTER MOUSE PAD

CROSS-REFERENCE TO RELATED APPLICATIONS

This application is filed as a continuation-in-part filed Dec. 9, 1998 of, and claims benefit of, U.S. patent application Ser. No. 09/209,050, now U.S. Pat. No. 6,143,395, and of International Application PCT/US99/26216, the entire disclosure of each of which is incorporated by reference herein for all purposes.

BACKGROUND OF THE INVENTION

This invention relates to a pointing device including a computer mouse pad.

A computer mouse is widely used as a pointing device for a personal computer, for controlling movement of a cursor over the display screen of the computer's monitor. The common form of computer mouse has a mouse body for gripping in the user's hand, the mouse body having a bottom wall which slides over a mouse pad. The bottom wall of the mouse body is formed with an opening which affords access to a cavity containing a mouse ball and a movement encoding mechanism. The mouse ball typically has a diameter of about $13/16$ inch. A retainer plate formed with a circular hole is fitted removably in the opening in the bottom wall of the mouse body. The diameter of the circular hole in the retainer plate is somewhat smaller than the diameter of the mouse ball, so the mouse ball is held captive in the cavity in the mouse body but protrudes through the hole in the retainer plate. As the user slides the mouse over the mouse pad, the mouse ball rolls against the movement encoding mechanism, which detects the rolling movement of the mouse ball and generates an electrical pulse signal in response thereto. The pulse signal is supplied to the computer's system unit and is used by the system unit to control movement of the cursor over the computer's monitor screen.

The computers that are used in schools are frequently equipped with mouses. If foreign matter, such as a dust particle, is present on the surface on which the mouse runs, such as a mouse pad, it might adhere to the mouse ball when the mouse moves over the particle. In this event, it is likely that the particle will be carried by the mouse ball into the cavity of the mouse body and be transferred to the movement encoding mechanism. There is then a possibility that operation of the movement encoding mechanism will be impaired. This may lead to erratic movement of the cursor. Although efforts are made to keep school computer labs clean, the computer mouse is frequently in need of cleaning to remove dirt from the ball and from the movement encoding mechanism.

A typical mouse pad is made of a resilient material, such as rubber. The upper surface of the mouse pad, on which the mouse slides, is smooth except for a layer of fabric which is glued to the upper surface of the mouse pad in order to provide frictional engagement with the mouse ball. Frequently, when a mouse that has been used on this type of mouse pad is cleaned, threads from the fabric layer of the mouse pad are found. It is likely that these threads are at least partly responsible for malfunction of the mouse.

SUMMARY OF THE INVENTION

In accordance with the invention there is provided a pointing device comprising a mouse having a mouse ball, and a mouse pad having a lower surface for resting on a support structure and an upper surface for supporting the mouse, the upper surface of the mouse pad being formed with grooves that are large enough that dust particles will fall into the grooves and will not adhere to the mouse ball when the mouse is moved over the mouse pad, the grooves being of width substantially smaller than the diameter of the mouse ball and being spaced at a distance substantially greater than the width of the grooves so that the mouse ball rolls smoothly over the mouse pad.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
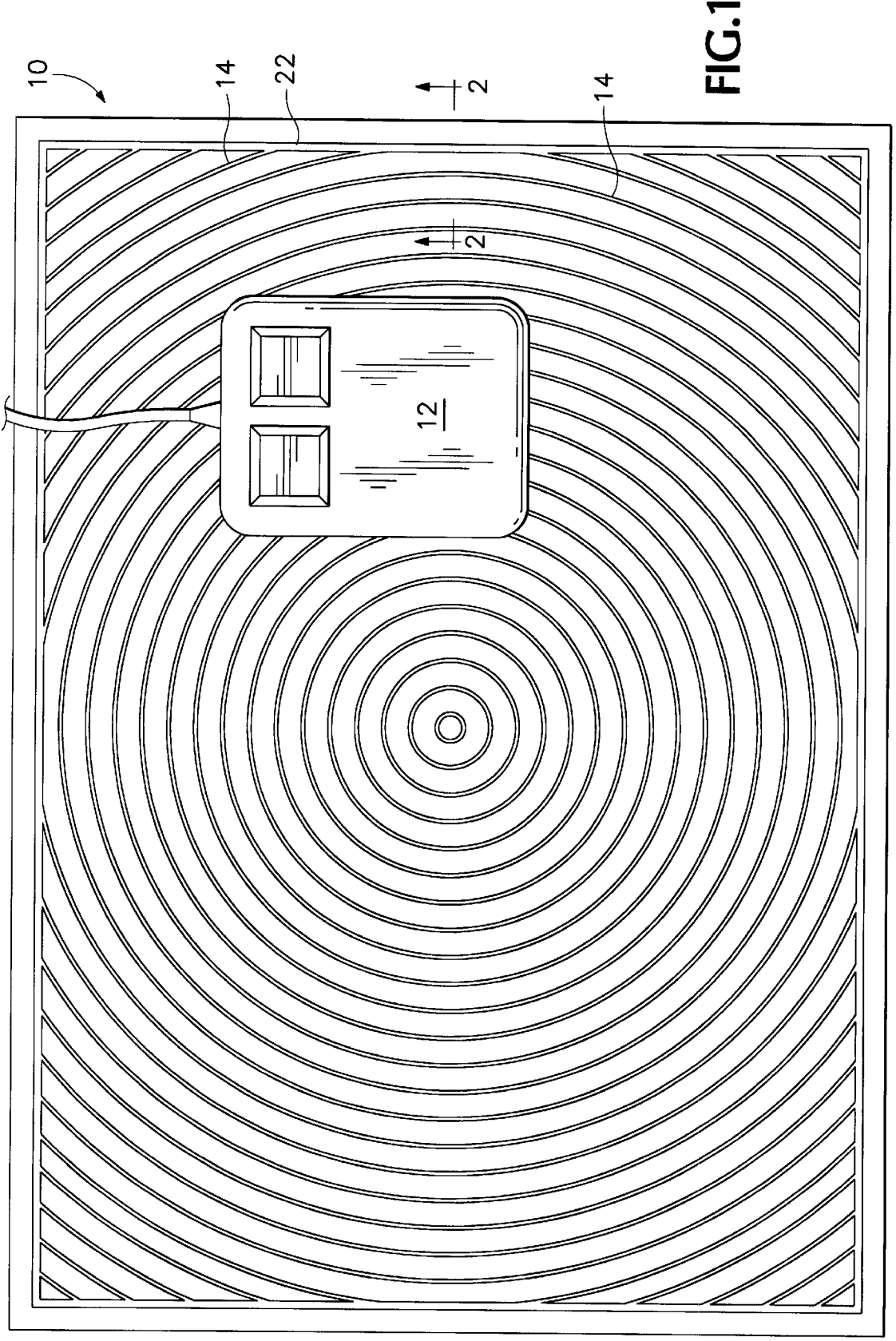
FIG. 1 is a top plan view of a first pointing device in accordance with the present invention.

The pointing device shown in FIG. 1 includes a mouse pad 10 and a mouse 12 having a ball about $13/16$ inch (2.06 cm) in diameter. There is no layer of fabric attached to the upper surface of the pad. On the contrary, the pad is molded to provide a pattern of narrow grooves 14, each typically about $1/32$ inch (0.08 cm) wide and at a spacing of about $3/16$ inch (0.48 cm), in its upper surface. The grooves are about $1/16$ inch (0.16 cm) deep. The upper corners of the grooves, where the grooves meet the upper surface of the pad, are sharp.

By forming the grooves in the upper surface of the pad, the effective surface area of the mouse pad is reduced by about one-seventh. It follows that approximately one-seventh of the dust particles that are precipitated on the mouse pad from the ambient air will fall in one of the grooves. Once a dust particle has fallen into a groove, it will remain in the groove until it is removed, e.g. by shaking the mouse pad or by vacuuming, and will not be picked up by the mouse ball and contaminate the movement encoding mechanism. Further, since the effective surface area of the mouse pad is reduced, the area of the mouse pad from which a particle can be picked up by the mouse ball during movement of the mouse is reduced. Moreover, if a particle of dust is picked up by the mouse ball and carried by the mouse ball while the ball rotates, there is a possibility that the particle will fall from the mouse ball into a groove.

Figure 2:
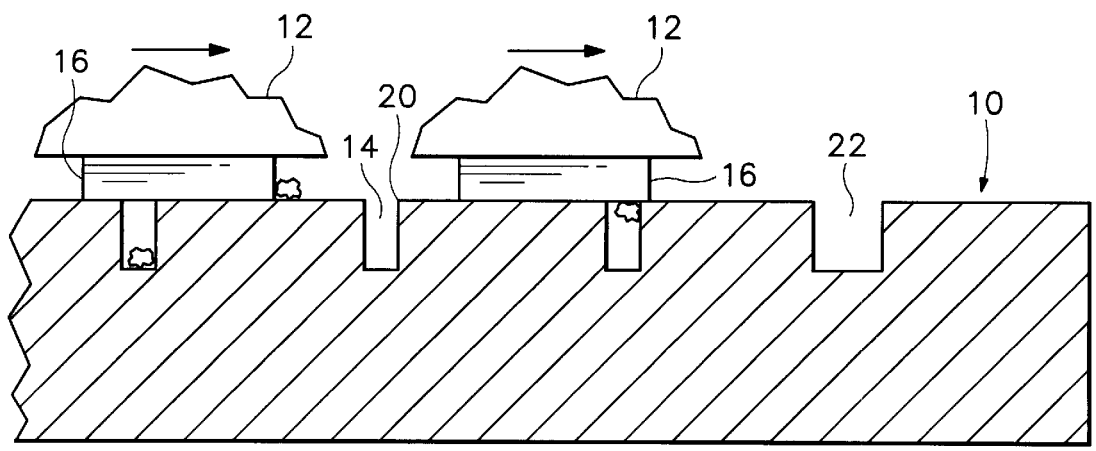
FIG. 2 is a sectional view taken on the line II—II in FIG. 1.

The bottom wall of the conventional mouse body is formed with gliders 16 which rest on the upper surface of the mouse pad. These gliders serve to sweep a foreign particle that settles on the land between two grooves toward the next groove along the path of movement of the mouse, as shown in FIG. 2. The particle may either fall into the groove as the glider advances across the groove or be wiped or scraped from the glider by the sharp edge 20 at the far side of the groove so that the particle then falls into the groove.

Since the width of the grooves is substantially less than the diameter of the mouse ball (only about one-twenty fifth of the diameter of the mouse ball in the case of the example), the grooves do not adversely affect the smoothness with which the ball rolls over the mouse pad and hence the smoothness with which the mouse slides over the mouse pad.

Since the mouse pad does not have a covering of fabric, there is one less source of foreign matter that can contaminate the movement encoding mechanism of the mouse.

The semisoft rubber that is used in manufacture of conventional mouse pads is somewhat sticky or gummy. This does not affect the performance of the conventional pointing device because the conventional pad has a covering of fabric, as mentioned above. However, if there were no covering, the gliders on the bottom of the mouse would not slide smoothly over the mouse pad, and foreign particles on the mouse pad would tend to stay in place and not be readily swept over the mouse pad by the gliders of the mouse. It is therefore preferred that the mouse pad of a pointing device in accordance with the invention not be made of the same type of rubber material as is used in manufacture of conventional mouse pads.

Conventionally, the mouse ball is made of a resilient material, or has a coating of a resilient material. Generally, good rolling contact between a resilient rolling element and a surface does not require that the surface be resilient. Therefore, it is preferred that the mouse pad of a pointing device in accordance with the invention be made of a material that is considerably harder than the semisoft rubber currently used for many mouse pads. For example, a semi-rigid polypropylene material, such as the polypropylene copolymer sold by Huntsman Corporation under the designation Huntsman PP P6M5B-015, having a Rockwell hardness of 75 measured by the method prescribed in ASTM D785 and having a melt flow rate of 22 g/10 min. measured by the method prescribed in ASTM D1238, is suitable.

As shown in FIG. 1, the pattern of grooves is made up of narrower concentric arcuate grooves 14 and a slightly wider peripheral groove 22 along the four edges of the mouse pad, surrounded by a margin strip. Some of the arcuate grooves intersect the peripheral groove. The width of the peripheral groove is greater than the possible error in position of an end of one of the arcuate grooves that intersect the peripheral groove, so that when the die for molding the pad is made, one can be assured that each arcuate groove that intersects the peripheral groove will open into the peripheral groove and will not encroach on the margin strip of the pad.

It will be appreciated that the invention is not restricted to the particular embodiment that has been described, and that variations may be made therein without departing from the scope of the invention as defined in the appended claims and equivalents thereof.

What is claimed is:

1. A pointing device comprising:

a mouse having a mouse ball, and a mouse pad having a lower surface for resting on a support structure and an upper surface for supporting the mouse, the upper surface of the mouse pad being formed with grooves that are large enough that dust particles will fall into the grooves and will not adhere to the mouse ball when the mouse is moved over the mouse pad, the grooves being of width substantially smaller than the diameter of the mouse ball and being spaced at a distance substantially greater than the width of the grooves so that the mouse ball rolls smoothly over the mouse pad.

2. A pointing device according to claim 1, wherein the grooves are in a pattern of concentric arcs.

3. A pointing device according to claim 1, wherein the grooves are about 1/32 inch in width and are at a spacing of about 3/16 inch.

4. A pointing device according to claim 3, wherein the grooves are about 1/16 inch deep.

5. A pointing device according to claim 1, wherein the grooves are at a spacing of about six times their width.

6. A pointing device according to claim 1, wherein the grooves have elongate ridges therebetween.

7. A pointing device according to claim 6, wherein the grooves are steep-sided and the sides of a groove meet the ridges at each side of the groove at a sharp edge, whereby a particle adhering to the underside of the mouse may be wiped from the mouse as the mouse traverses the groove.

8. A pointing device according to claim 1, wherein the mouse pad is made of a synthetic polymer material having a Rockwell hardness of about 75.

9. A pointing device according to claim 1, wherein the mouse pad is made of a synthetic polymer material having a melt flow rate of about 22 g/10 min.

10. A pointing device according to claim 1, wherein the mouse pad is made of a polypropylene material.

11. A pointing device according to claim 1, wherein the mouse pad is made of a polypropylene copolymer material.

* * * * *